United States Patent [19]

Lenz

[11] Patent Number: 4,531,294
[45] Date of Patent: Jul. 30, 1985

[54] APPARATUS FOR MEASURING THE DIAMETER OF ROD-SHAPED WORK-PIECES

[75] Inventor: Wolfgang Lenz, Steyr, Austria

[73] Assignee: Steyr-Daimler-Puch Aktiengesellschaft, Vienna, Austria

[21] Appl. No.: 539,421

[22] Filed: Oct. 6, 1983

[30] Foreign Application Priority Data

Oct. 15, 1982 [AT] Austria ................................. 3793/82

[51] Int. Cl.³ ................................................ G01B 5/00
[52] U.S. Cl. ................................. 33/178 R; 33/178 E; 33/550; 33/147 E; 209/533; 209/602
[58] Field of Search ............. 33/178 R, 178 E, 178 D, 33/174 Q, 174 L, 174 R, 147 L, 147 N, 147 E, 172 E, 169 R; 209/531, 533

[56] References Cited

U.S. PATENT DOCUMENTS

| 2,531,317 | 11/1950 | Baney et al. | 33/178 X |
| 3,417,476 | 12/1968 | Martens | 33/174 L |
| 3,787,983 | 1/1974 | Diem | 33/174 Q |
| 4,182,044 | 1/1980 | Peonski | 33/178 E X |

FOREIGN PATENT DOCUMENTS 0023802 2/1982 Japan ................................. 33/178 E

OTHER PUBLICATIONS

IBM Tech. Bulletin, "Cathode Ray Tube Test Fixture", vol. 2, #5, 2/60.

Primary Examiner—Harry N. Haroian
Attorney, Agent, or Firm—Kurt Kelman

[57] ABSTRACT

Apparatus for measuring or monitoring the diameter of rod-shaped workpieces comprises two driven and interdigitating pinion rollers for rotating the workpiece about its longitudinal axis and at least one pair of mutually opposite measuring gages adapted to be urged against the workpiece and connected to an electronic evaluating device. To permit a rapid measurement of the workpieces which is independent of the attention and carefulness of an operator, the workpiece is fed via an inclined trough to the pinion rollers so that the workpiece engages an axial stop. The workpiece is then urged against the pinion rolls by a pressure-applying roller, which is radially movable into and out of engagement with the workpiece. By spring force and/or a pressure fluid the measuring gages are jointly moved into and out of engagement with the workpiece when the latter lies on the pinion rolls and is axially located by the axial stop. The pinion rolls and the axial stop are succeeded by a device for discharging the workpiece from the apparatus.

8 Claims, 3 Drawing Figures

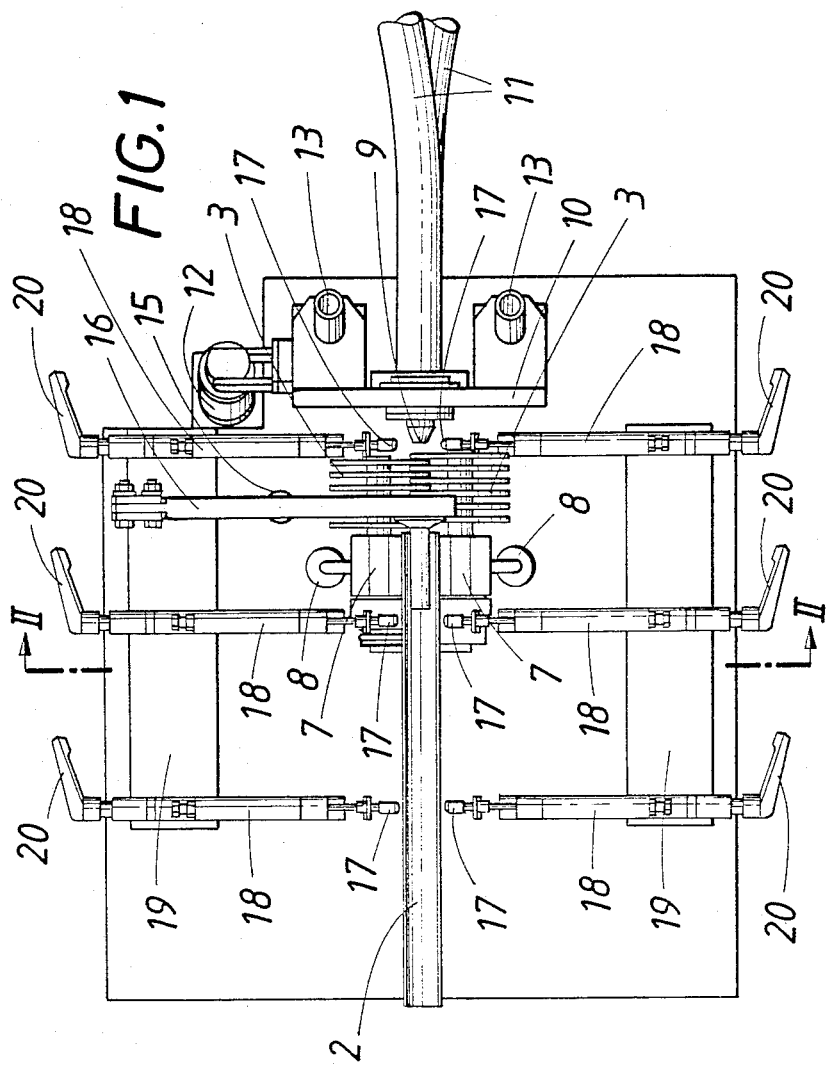

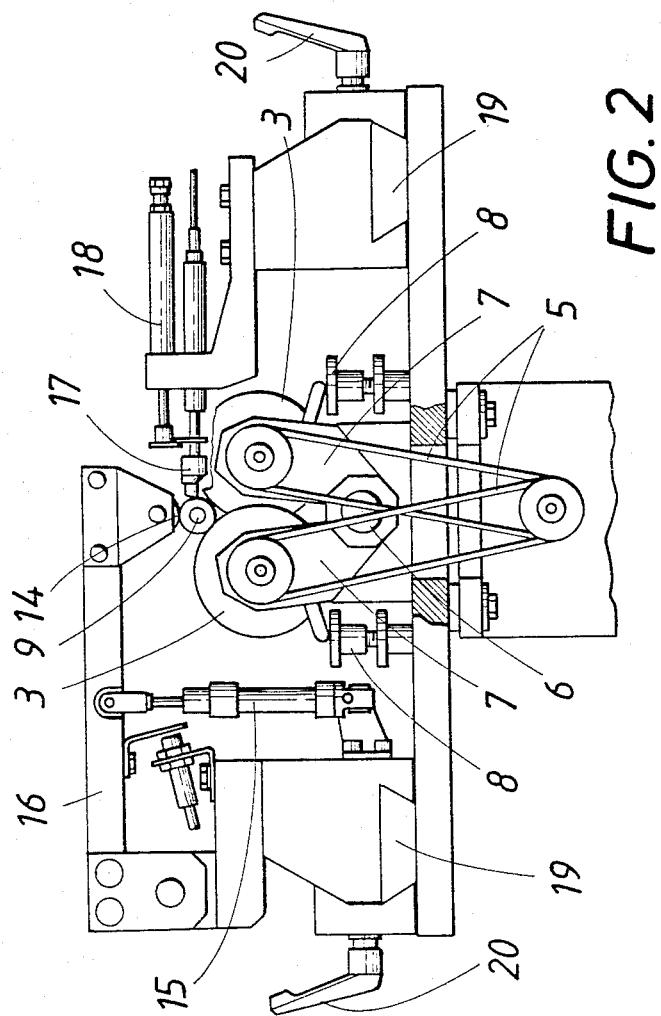

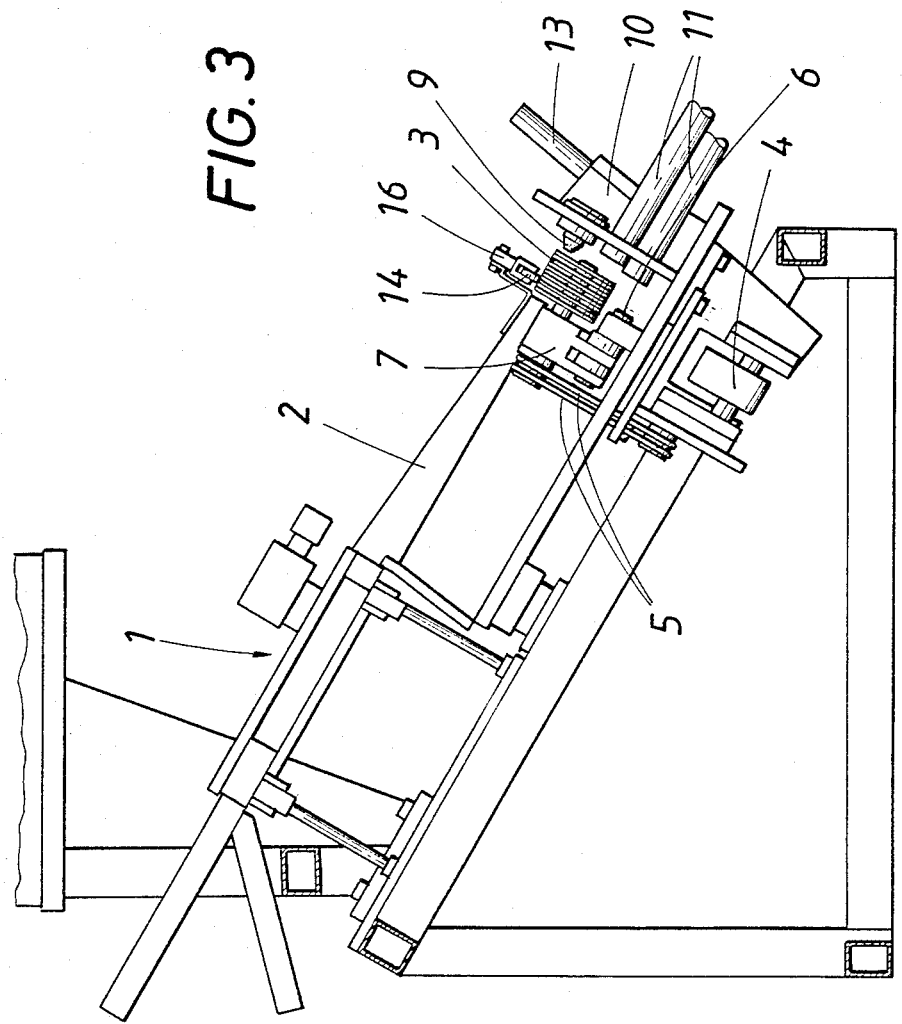

APPARATUS FOR MEASURING THE DIAMETER OF ROD-SHAPED WORK-PIECES

This invention relates to apparatus for measuring or monitoring the diameter of rod-shaped workpieces, comprising a workpiece-rotating device and at least one pair of mutually opposite measuring gages adapted to be urged against the workpiece and connected to an electronic evaluating device.

Such apparatus is already known, e.g., for measuring the diameters of twist drills. In its operation, samples of workpieces manufactured by a machine tool are inserted by hand into a gripping device and are rotated. The measuring gages are subsequently urged against the workpiece. Signals representing the measured values are delivered by the measuring gages to an electronic indicating device, from which the operators can get the information which will be required if the machine tool must be re-adjusted so that specified measured values within a predetermined tolerance range will be obtained. In the case of twist drills, three measured values, for instance, are measured for each drill, namely, the shank diameter and, for determining the taper, the two diameters at the ends of the tapered cutting edge portion. When a deviation from the specified taper is detected, the grinding wheel must be replaced or must be dressed and must subsequently be re-adjusted. The operation of such measuring apparatus and the corresponding re-adjustment of the machine tool take substantial time and can be performed only by skilled labor. For this reason only relatively few samples can be taken from the current production and measured. This is a disadvantage because it inevitably involves a larger percentage of rejects.

It is an object of the invention to eliminate that disadvantage and to provide apparatus which is of the kind described first hereinbefore and which ensures that the workpieces will be measured more quickly and in a manner which is independent of the attention and carefulness of the operator.

This object is accomplished according to the invention in that the workpiece is fed in an inclined trough and preferably under gravity engages an axial stop, the device for rotating the workpiece consists of two interdigitating driven pinion rolls, a pressure-applying roller is provided, which is adapted to be moved into and out of engagement with the workpiece in a radial direction, the measuring gages are adapted to be moved into and out of engagement with the workpiece in unison by spring force and/or a pressure fluid, and means for discharging the workpiece from the apparatus are provided.

Such apparatus can be operated without continual attention by an operator and permits the workpieces to be tested in close succession without a loss of time for manual work required to grip each workpiece. The incoming workpieces move from the inclined trough to the driven pinion rolls under gravity or under kinetic energy imparted to the workpieces and finally engage the axial stop. Under the control of conventional sensors, the pressure-applying roller is urged against the workpiece immediately thereafter and the measuring gages are urged against the workpiece. The measuring gages can be retracted after a short time and the workpiece is then discharged so that the apparatus is available immediately for the next measurement. For this reason a much higher percentage of the workpieces can be tested than before and it may even be possible to test all workpieces. There can be no error on the part of an operator. By means of the interdigitating driven pinion rolls the workpiece can be rotated about its axis during the measurement even though the workpiece is not gripped by separate means.

To permit the use of one and the same apparatus for measuring workpieces differing in thickness, it is a feature of the invention that at least one of the pinion rolls is pivoted on an axis which is parallel to the axis of the roll so that the space between the pinion rolls and the pressure-applying roll will depend on the angular position of the roll or rolls and workpieces which differ greatly in diameter can be held in this space whereas the relation of the axis of the workpiece to the axes of the pinion rolls will remain substantially unchanged.

In accordance with a further feature of the invention the axial stop is adapted to be moved out of the path for the workpiece in a direction which is transverse to the axes of the rolls. In that case the workpiece which has been measured can be advanced in its longitudinal direction so that the means for discharging the workpiece may be simple in design.

It will be particularly suitable to provide for the discharge of the workpiece an arrangement comprising at least two tubes, which extend generally in the longitudinal direction of the pinion rolls and are displaceable transversely to this direction, and means for controlling the extent of the displacement in dependence on the measured value. In that case each workpiece can be discharged through one or the other tube in dependence on the measured value so that a sorting will be effected.

The design can be simplified further in that the axial stop and the tubes are mounted on a common slide. In that case the movement of the axial stop out of the path for the workpiece will be automatically accompanied by the movement of one or the other tube into this path so that simple means can be provided for controlling the operation of the axial stop and of the discharge means.

Simple means for moving the pressure-applying roller into and out of engagement with the workpiece comprise an arm, in which said roller is rotatably mounted and which is pivotally movable transversely to the axes of the pinion rolls, preferably under the control of a pressure fluid. In that case a fluid-operable actuator is preferably used to move the arm which carries the pressure-applying roller and the actuator is supplied with pressure fluid under the control of signals from the measuring gages when a workpiece has reached the axial stop and when the measurement has been effected.

Within the scope of the invention the axis of the pressure-applying roller includes an acute angle with the axes of the pinion rolls so that the force exerted by the pressure-applying roller will have a component which is directed toward the axial stop and ensures that the workpiece will reliably engage the axial stop. It will be understood that the angle between the axis of the pressure-applying roller and the axes of the pinion rolls will be small so that the rotation of the workpiece will not be adversely affected.

The workpiece may be moved to the pinion rolls in a forked loading trough having a prong which is directed to the pinion rolls and another prong which is connected to a by-pass trough and a pivoted deflecting tongue is provided for selectively closing one of the prongs or the other. With that arrangement more or less workpieces can be taken in any desired succession from the series of workpieces which have been manufactured because in dependence on the position of the tongue each workpiece will either be directed to the pinion rolls, so that the workpiece will be measured, or will be discharged via the by-pass trough.

In apparatus for measuring workpieces having a cylindrical shank and a tapered cutting edge portion, particularly twist drills, reamers and end mills, the dimensions of the pinion rolls and of the pressure-applying roller are selected to suit the cylindrical shank so that the workpiece will be properly centered during its rotation and the measuring gages will always be in the proper position relative to the axis of the workpiece.

The apparatus may be used for an electrical control of the continual correction of the adjustment of a machine tool used to make the workpieces which are to be measured or monitored. That special use is permitted because the apparatus according to the invention is unique in that it permits a quick automatic measurement of the workpieces as they become available and the measuring gages deliver electric signals which in the evaluating device, consisting in that case of a control device, are converted to electrical signals for changing the adjustment of the machine tool in dependence on the measured values.

An illustrative embodiment of the invention is shown on the drawing, the figures of which are drawn to different scales.

FIG. 1 is a top plan view showing the essential parts of apparatus for measuring or monitoring the diameters of twist drills, FIG. 2 is a transverse sectional view taken on line II—II in FIG. 1, and FIG. 3 is a side elevation showing the apparatus in a view in which the measuring gages and their holders have been omitted for the sake of clearness.

In the embodiment shown by way of example, the apparatus according to the invention succeeds a machine tool for making twist drills. The workpieces discharged from the machine tool first enter a presorting device 1 (FIG. 3), which comprises a pivoted deflector for delivering each workpiece either to a by-pass trough or to an inclined trough 2, which belongs to the measuring apparatus. The inclined trough 2 is succeeded by a rotating device which consists of two interdigitating pinion rolls 3. The pinion rolls 3 are driven by a motor 4 via a transmission including belt drive 5. The two pinion rolls 3 are pivotally movable about an axle 6, which is parallel to the pinion rolls. The pivoted arms 7 carrying the pinion rolls 3 have projections which are supported on adjusting screws 8.

Each workpiece which has been fed via the inclined trough 2 is engaged by axial stop 9, which is carried by a slide 10. The slide 10 also has means for discharging the workpiece, which comprises two tubes 11 extending generally in the longitudinal direction of the pinion rolls 3. Fluid-operable actuator 12 enables the slide 10 to be displaced on guide tubes 13 in a direction transverse to the longitudinal direction of the pinion rolls 3.

Adjacent to the pinion rolls 3, a pressure-applying roller 14 is provided, which serves to urge the workpiece against the pinion rolls and is mounted on arm 16. By means of a fluid-operable actuator 15, the arm 16 is pivotally movable in a direction which is transverse to the longitudinal direction of the pinion rolls 3.

For measuring the diameter of each workpiece which rests on the pinion rolls 3, the workpiece is held by the pressure-applying roller 14 and axially located by the stop 9, and three pairs of diametrically opposite measuring gages 17 are provided, which have been omitted on the left in FIG. 2 and have been entirely omitted in FIG. 3. These measuring gages are spring-urged against the workpiece and are retracted from the latter by fluid-operable actuators 18. The measuring gages 17 are slidably mounted on guides 19 and by means of clamping levers 20 can be fixed in their adjusted positions.

As soon as the workpiece has reached the axial stop 9, the pressure-applying roller 14 is engaged with the workpiece and rotation is imparted to the workpiece. The measurement is then effected by means of the measuring gages. That measurement obviously takes only a very short time. The measuring gages 17 are then retracted from the workpiece, the arm 16 carrying the pressure-applying roller 14 is swing upwardly and the slide 10 is displaced so that one of the tubes 11 enters the path of the workpiece, which is now discharged through this tube. The slide is then displaced to return the stop 9 to its original position so that the sequence of operation which has been described can be repeated for a measurement of another workpiece. The measuring gages 17 may be connected to an electronic control device by which the adjustment of the machine tool preceding the apparatus can be corrected in dependence on the values which have been measured.

What is claimed is:

1. An apparatus for measuring the diameter of a rod-shaped workpiece, comprising the combination of
   (a) a workpiece rotating means for rotating the workpiece about an axis, the workpiece rotating means being comprised of
      (1) two interdigitating pinion rolls driven in the same sense about respective axes extending parallel to the workpiece axis and arranged to engage said workpiece for centering and rotation of the workpiece about said axis, and
      (2) means for pivoting the pinion rolls about a further axis extending parallel to the axes of the rolls for independently changing the distance between said axes,
   (b) a workpiece-feeding means including an inclined trough for feeding the workpiece to the pinion rolls for rotation,
   (c) a stop engageable by the workpiece fed to the pinion rolls to define a predetermined axial position of the workpiece on the pinion rolls,
   (d) a pressure-applying roller radially movable with respect to the workpiece axis into and out of engagement with said workpiece in said predetermined axial position, the roller being adapted to urge said workpiece against said pinion rolls when radially moved into engagement with said workpiece,
   (e) workpiece diameter measuring means adapted to measure the diameter of the workpiece in said predetermined axial position, the measuring means including
      (1) at least one pair of measuring gages spaced apart diametrically with respect to the workpiece axis, and
      (2) gage-actuating means for moving the measuring gages in unison into and out of engagement with the workpiece in said predetermined axial position, and
   (f) a workpiece discharging means for discharging said workpiece from said axial position upon disengagement of the pressure-applying roller and the measuring gages.

2. The apparatus set forth in claim 1, wherein said gage-actuating means comprise fluid-operable means.

3. The apparatus set forth in claim 1, wherein
said workpiece-feeding means, said workpiece-rotating means and said workpiece-discharging means define a workpiece path adapted to contain said workpiece in said predetermined position, and further comprising
means for moving said stop into and out of said workpiece path.

4. The apparatus set forth in claim 1, further comprising an arm rotatably mounting the pressure-applying roller and pivotally movable transversely to the axes of said pinion rolls for moving the roller into and out of engagement with said workpiece.

5. The apparatus set forth in claim 4, further comprising fluid-operable means for pivotally moving said arm.

6. In apparatus for measuring the diameter of rod-shaped workpieces, comprising
workpiece-locating and -rotating means for locating a workpiece in a predetermined axial position and for centering said workpiece in said predetermined axial position on a predetermined axis and for rotating said workpiece on said axis, and
at least one pair of measuring gages, which are diametrically spaced apart with respect to said axis and adapted to measure the diameter of a workpiece which is in said predetermined axial position, the improvement residing in that
said workpiece-locating and -rotating means comprise a stop, which is engageable by said workpiece to define said axial position, two interdigitating pinion rolls arranged to engage said workpiece in said predetermined axial position and having axes which are parallel to said predetermined axis, means for rotating said pinion rolls in the same sense, a pressure-applying roller, which is radially moveable with respect to said predetermined axis, and roller-actuating means for radially moving said roller relative to said predetermined axis into and out of engagement with said workpiece in said predetermined axial position so that said roller is adapted to urge said workpiece against said pinion rolls, and
said apparatus also comprises workpiece-feeding means including an inclined trough for feeding a workpiece to said predetermined axial position in engagement with said stop, gage-actuating means for moving said measuring gages in unison into and out of engagement with a workpiece which is in said predetermined axial position, and workpiece-discharging means for discharging said workpiece from said predetermined axial position out of said apparatus, said workpiece-discharging means comprising at least two tubes extending generally in the direction of the axes of said pinion rolls and displaceable in a direction which is transverse thereto, and means for displacing said tubes in said transverse direction to an extent which depends on the diameter which has been measured by said measuring gages.

7. In apparatus for measuring the diameter of rod-shaped workpieces, comprising
workpiece-locating and -rotating means for locating a workpiece in a predetermined axial position and for centering said workpiece in said predetermind axial position on a predetermined axis and for rotating said workpiece on said axis, and
at least one pair of measuring gages, which are diametrically spaced apart with respect to said axis and adapted to measure the diameter of a workpiece which is in said predetermined axial position, the improvement residing in that
said workpiece-locating and -rotating means comprise a stop, which is engageable by said workpiece to define said axial position, two interdigitating pinion rolls arranged to engage said workpiece in said predetermined axial position and having axes which are parallel to said predetermined axis, means for rotating said pinion rolls in the same sense, a pressure-applying roller, which is radially movable with respect to said predetermined axis, and roller-actuating means for radially moving said roller relative to said predetermined axis into and out of engagement with said workpiece in said predetermined axial position so that said roller is adapted to urge said workpiece against said pinion rolls, and
said apparatus also comprises workpiece-feeding means including an inclined trough for feeding a workpiece to said predetermined axial position in engagement with said stop, gage-actuating means for moving said measuring gages in unison into and out of engagement with a workpiece which is in said predetermined axial position, and workpiece-discharging means for discharging said workpiece from said predetermined axial position out of said apparatus, said workpiece-feeding means, said workpiece-locating and -rotating means and said workpiece-discharging means defining a workpiece path adapted to contain said workpiece in said predetermined position, said workpiece-discharging means comprises at least two tubes tending generally in the direction of the axes of said pinion rolls, and further comprising a common slide on which said stop and said tubes are mounted, the slide being displaceable in a direction transverse to said direction of the axes, means for moving said slide in said direction to move said stop into and out of said path and to move each of said tubes into said path, and means for controlling the extent of the displacement of said slide in dependence on the diameter which has been measured by said measuring gages.

8. In apparatus for measuring the diameter of rod-shaped workpieces, comprising
workpiece-locating and -rotating means for locating a workpiece in a predetermined axial position and for centering said workpiece in said predetermined axial position on a predetermined axis and for rotating said workpiece on said axis, and
at least one pair of measuring gages, which are diametrically spaced apart with respect to said axis and adapted to measure the diameter of a workpiece which is in said predetermined axial position, the improvement residing in that
said workpiece-locating and -rotating means comprise a stop, which is engageable by said workpiece to define said axial position, two interdigitating pinion rolls arranged to engage said workpiece in said predetermined axial position and having axes which are parallel to said predetermined axis, means for rotating said pinion rolls in the same sense, a pressure-applying roller, which is radially movable with respect to said predetermined axis, and roller-actuating means for radially moving said roller relative to said predetermined axis into and out of engagement with said workpiece in said predetermined axial position so that said roller is adapted to urge said workpiece against said pinion rolls, said pressure-applying roller being rotatable on an axis defining an acute angle with the axes of said pinion rolls, and said apparatus also comprises workpiece-feeding means including an inclined trough for feeding a workpiece to said predetermined axial position in engagement with said stop, gage-actuating means for moving said measuring gages in unison into and out of engagement with a workpiece which is in said predetermined axial position, and workpiece-discharging means for discharging said workpiece from said predetermined axial position out of said apparatus.

* * * * *